United States Patent
Hong et al.

(10) Patent No.: US 10,708,882 B2
(45) Date of Patent: Jul. 7, 2020

(54) UE CAMPING METHOD AND APPARATUS, PAGING METHOD AND APPARATUS, AND STORAGE MEDIUM

(71) Applicant: BEIJING XIAOMI MOBILE SOFTWARE CO., LTD., Beijing (CN)

(72) Inventors: Wei Hong, Beijing (CN); Li Wang, Beijing (CN); Ming Zhang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/236,468

(22) Filed: Dec. 29, 2018

(65) Prior Publication Data
US 2019/0141669 A1 May 9, 2019

Related U.S. Application Data (63) Continuation of application No. PCT/CN2016/087986, filed on Jun. 30, 2016.

(51) Int. Cl.
*H04W 68/00* (2009.01)
*H04W 68/02* (2009.01)
(Continued)

(52) U.S. Cl.
CPC .......... *H04W 68/005* (2013.01); *H04W 8/14* (2013.01); *H04W 36/08* (2013.01); *H04W 68/02* (2013.01); *H04W 76/00* (2013.01)

(58) Field of Classification Search
CPC ..... H04W 68/005; H04W 68/02; H04W 8/14; H04W 8/08; H04W 8/082; H04W 8/087; H04W 36/08; H04W 36/34; H04W 76/00
See application file for complete search history.

(56) References Cited

U.S. PATENT DOCUMENTS

2010/0093356 A1* 4/2010 Lee .................. H04W 36/0022
455/437
2010/0272004 A1* 10/2010 Maeda .................. H04L 5/0007
370/312
(Continued)

FOREIGN PATENT DOCUMENTS

CN 1941993 A 4/2007
CN 101043721 A 9/2007
(Continued)

OTHER PUBLICATIONS

International Search Report (including English translation) and Written Opinion issued in PCT/CN2016/087986, dated Mar. 29, 2017, 8 pages.

(Continued)

Primary Examiner — Magdi Elhag
(74) Attorney, Agent, or Firm — Arch & Lake LLP (57) ABSTRACT

A user equipment camping method and apparatus and a paging method and apparatus, and a storage medium are provided in the technical field of communications. The method includes: detecting a current camped cell; when it is determined through the detection that the current camped cell satisfies a triggering condition and when a UE is in a silence state, determining a target camped cell, wherein the silence state is a state where the UE performs no data transmission after performing a data transmission; and performing reselection from the current camped cell to the target camped cell. According to this disclosure, when a UE is in a silence state and the UE determines that its serving cell needs to be changed, the UE directly performs a cell reselection procedure instead of performing a cell handover procedure, thereby preventing a large amount of air interface signaling and network side signaling from being caused by (Continued)

the cell handover procedure and hence significantly reducing signaling consumption.

15 Claims, 9 Drawing Sheets

(51) Int. Cl.
*H04W 36/08* (2009.01)
*H04W 76/00* (2018.01)
*H04W 8/14* (2009.01)

(56) References Cited

U.S. PATENT DOCUMENTS

| | | | | |
|---|---|---|---|---|
| 2011/0201343 | A1* | 8/2011 | Pinheiro | H04W 64/00 455/450 |
| 2014/0098693 | A1* | 4/2014 | Tabet | H04W 36/0083 370/252 |
| 2014/0378140 | A1 | 12/2014 | Gopal et al. | |
| 2015/0103770 | A1* | 4/2015 | Chang | H04W 24/04 370/329 |
| 2015/0173121 | A1* | 6/2015 | Miklos | H04W 76/38 370/329 |
| 2015/0358845 | A1* | 12/2015 | Chapman | H04W 24/08 455/67.11 |
| 2016/0050643 | A1* | 2/2016 | Pudney | H04W 72/048 455/450 |
| 2016/0295637 | A1* | 10/2016 | Bergquist | H04W 76/00 |
| 2016/0302233 | A1* | 10/2016 | Gopala Krishnan | H04W 74/0833 |
| 2018/0288667 | A1* | 10/2018 | Xie | H04W 36/30 |
| 2018/0317139 | A1* | 11/2018 | Li | H04W 52/0209 |
| 2018/0324656 | A1* | 11/2018 | Chen | H04W 36/0083 |
| 2019/0014515 | A1* | 1/2019 | Zee | H04W 36/08 |
| 2019/0075613 | A1* | 3/2019 | Teyeb | H04W 36/0083 |
| 2019/0124622 | A1* | 4/2019 | Nord | H04W 24/10 |

FOREIGN PATENT DOCUMENTS

| | | | |
|---|---|---|---|
| CN | 105657861 A | 6/2016 | |
| WO | 2011162667 A1 | 12/2011 | |
| WO | 2013020402 A1 | 2/2013 | |
| WO | WO-2015010458 A1 * | 1/2015 | |
| WO | 2016092425 A2 | 6/2016 | |
| WO | WO-2017113986 A1 * | 7/2017 | H04W 52/0209 |

OTHER PUBLICATIONS

Extended European Search Report to European Patent Application No. 16906765.9 dated Jan. 22, 2020, (10p).

* cited by examiner

UE CAMPING METHOD AND APPARATUS, PAGING METHOD AND APPARATUS, AND STORAGE MEDIUM

CROSS-REFERENCE TO RELATED APPLICATIONS

This application is based upon and claims the priority of PCT patent application No. PCT/CN2016/087986 filed on Jun. 30, 2016, the entire contents of which are hereby incorporated by reference herein.

TECHNICAL FIELD

The present disclosure is related to the technical field of communications, and more particularly to a User Equipment (UE) camping method and apparatus, a paging method and apparatus, and a storage medium.

BACKGROUND

With the development of communication technology, mobile communications have made a great leap forward from voice services to mobile broadband data services, which not only greatly changes people's life style but also significantly promotes the development of society and economy. As two major driving forces for the future development of mobile communications, mobile Internet and Internet of Things enable a wide range of applications of the Fifth Generation (5G) technology. Towards 2020 and beyond, data traffic will increase by several thousand times, and connections among hundreds of billions of devices and diverse service requirements will pose serious challenges to the 5G system design. The 5G technology will satisfy people's very high requirements for traffic density, number of connections and mobility, and can provide users with extreme service experiences such as high fidelity video, virtual reality, augmented reality, cloud desktop and online games. The 5G technology will penetrate into fields such as Internet of Things to be deeply integrated with industrial facilities, medical devices, vehicles and the like, so as to completely realize "Internet of Everything" and effectively satisfy requirements for information services in vertical industries such as industry, medical treatment and transportation. Further, the 5G technology will significantly improve energy and cost efficiency of network construction and operation, promote service innovation capability comprehensively, and enlarge the scope of the mobile communications industry.

However, in a conventional Long Term Evolution (LTE) network, if a UE in a Radio Resource Control (RRC) connection state needs to change its serving cell during its movement, handover has to be conducted, which results in a large amount of air interface signaling and core network side signaling.

SUMMARY

To address the problem in the related art, the present disclosure provides a UE camping method and apparatus, a paging method and apparatus, and a storage medium.

According to a first aspect, there is provided a paging method, which is implemented in a base station. The method may include: receiving a paging request for a UE, wherein the paging request carries identification information of the UE, and the UE has switched to a silence state in a cell covered by the base station and has performed reselection to a target camped cell; acquiring a locally stored context of the UE; sending query requests to a plurality of base stations, each of the query requests carrying the identification information of the UE; and when receiving a query response from a first base station, sending the context of the UE to the first base station, so that the first base station initiates paging of the UE.

According to a second aspect, there is provided a base station, comprising a transmitter, a receiver, a memory and a processor connected with the transmitter, the receiver and the memory. The processor is configured to: receive a paging request for a UE, wherein the paging request carries identification information of the UE, and the UE has switched to a silence state in a cell covered by the base station and has performed reselection to a target camped cell; acquire a locally stored context of the UE; send query requests to a plurality of base stations, each of the query requests carrying the identification information of the UE; and when receiving a query response from a first base station, send the context of the UE to the first base station, so that the first base station initiates paging of the UE.

According to a third aspect, there is provided a non-transitory computer-readable storage medium having stored therein instructions that, when executed by a processor of a base station, causes the base station to perform a paging method, the method comprising: receiving a paging request for a UE, wherein the paging request carries identification information of the UE, and the UE has switched to a silence state in a cell covered by the base station and has performed reselection to a target camped cell; acquiring a locally stored context of the UE; sending query requests to a plurality of base stations, each of the query requests carrying the identification information of the UE; and when receiving a query response from a first base station, sending the context of the UE to the first base station, so that the first base station initiates paging of the UE.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

In order to make objects, solutions and advantages of the disclosure more apparent, embodiments of the disclosure will be described below in detail in conjunction with the accompanying drawings.

Reference will now be made in detail to embodiments, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

Figure 1:
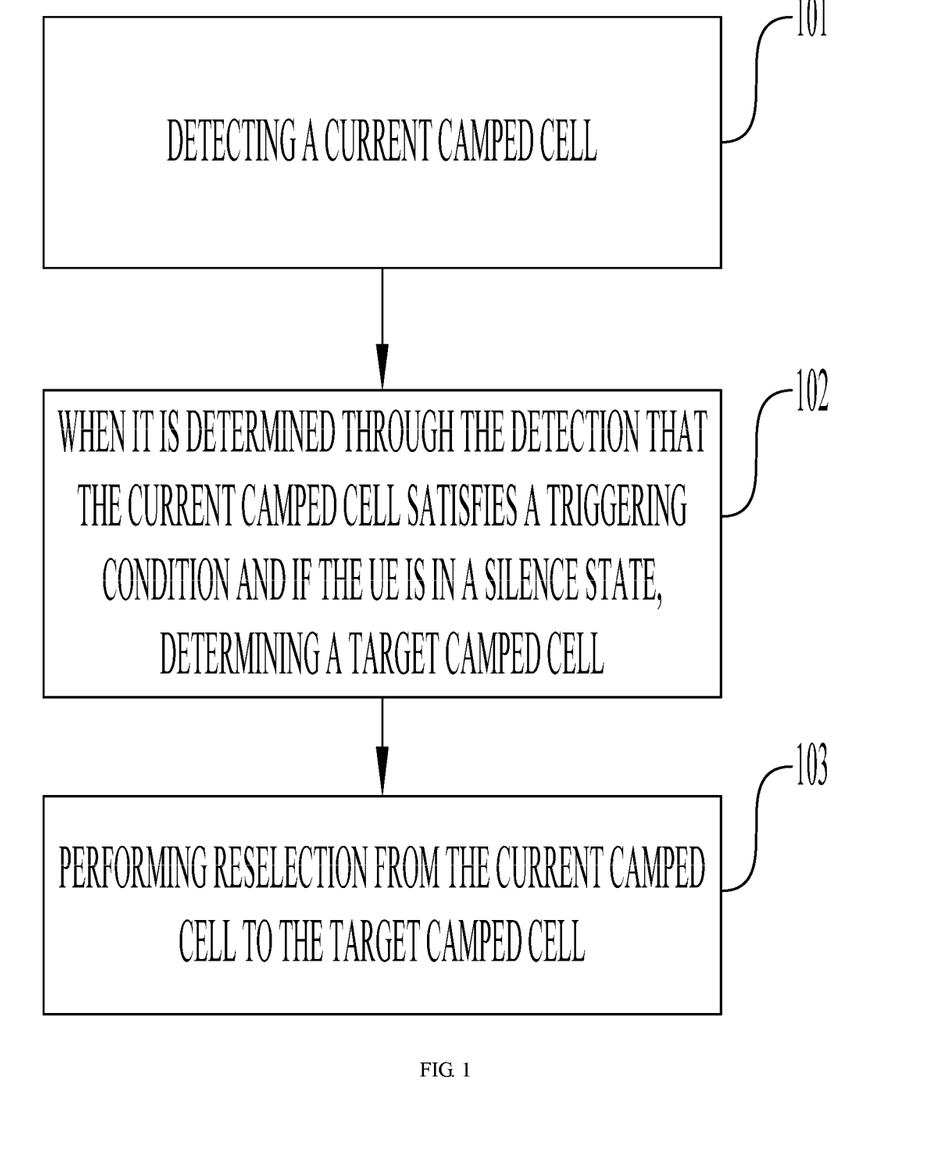
FIG. 1 is a flowchart of a user equipment camping method according to an example.

FIG. 1 is a flowchart of a user equipment camping method according to an example. As shown, the camping method is used in a UE and comprises the following steps.

In step 101, a current camped cell is detected.

The UE may determine whether its serving cell needs to be changed, by detecting a parameter such as signal strength (e.g., Reference Signal Received Power (RSRP)) of the current camped cell. Here, in the detecting process, the UE may also detect neighboring cells of the current camped cell, in order to subsequently select a target camped cell based on parameters such as signal strengths of the neighboring cells.

It should be noted that the above-exemplified parameter (such as RSRP) is just given as an example in the embodiment of the disclosure but does not limit the specific parameter to be detected.

In step 102, when it is determined through the detection that the current camped cell satisfies a triggering condition and when the UE is in a silence state, a target camped cell is determined. The silence state is a state where the UE performs no data transmission after performing a data transmission.

The triggering condition may be that the signal strength of the current camped cell is lower than a first predetermined threshold, the number of accesses to the current camped cell is greater than a second predetermined threshold and so on, which is not limited in the disclosure.

The UE may have the following three states.

(1) Idle state, which refers to a state where after powered on the UE has not performed data transmission yet. In this state, the UE has not performed an RRC connection procedure and the like.

(2) RRC connection state, which refers to a state where when having data to be transmitted the UE initiates an RRC connection procedure and thus an RRC connection is established. In this state, uplink or downlink data transmission may be performed.

(3) Silence state, which refers to a state where there is no data transmission after a data transmission is performed. In this state, upon detecting that the UE needs to change its serving cell, a cell reselection procedure may be directly performed instead of performing a cell handover procedure.

According to the above description, when the UE is in a silence state, the UE may determine a target camped cell based on the detection in step 101. The process of detecting the target camped cell may include: selecting, from a list of neighboring cells, a cell satisfying a camping condition as the target camped cell. Alternatively or additionally, other methods may be used for collecting candidate cells and selecting a target camped cell from the candidate cells, and will not be described redundantly herein. Alternatively or additionally, the process may comprise a measurement procedure, a candidate cell evaluation and sorting procedure, a cell re-searching procedure, a cell reselection evaluation procedure and the like. The embodiment of the disclosure just generally describes but does not limit the implementation of the above process.

In step 103, reselection from the current camped cell to the target camped cell is performed.

After determining the target camped cell, when the UE needs to perform data transmission, it will send a corresponding request to a base station corresponding to the reselected target camped cell so as to establish an RRC connection or the like, which is not limited in the embodiment of the disclosure.

In the above-described UE camping process, a novel UE state is proposed, so that when a UE is in such a silence state and when the UE determines that its serving cell needs to be changed, the UE directly performs a cell reselection procedure instead of performing a cell handover procedure, thereby preventing a large amount of air interface signaling and network side signaling from being caused by the cell handover procedure and hence significantly reducing signaling consumption.

In a possible implementation, when there is no data transmission request within a predetermined time period after the UE's data transmission is completed, it is determined that the UE switches from an RRC connection state to the silence state.

Correspondingly, at the base station side, when it is determined that the UE switches from the RRC connection state to the silence state, a context of the UE is stored. The context of the UE may include the UE's terminal capacity information, bearer information, and the like. Based on the context of the UE, the UE may be managed. Typically, when the UE switches from the RRC connection state to another state, the base station will delete the context of the UE previously stored. In the embodiment of the disclosure, however, the context of the UE is not deleted, but is used later when queried by another base station, thereby significantly reducing the amount of signaling at the core network side.

Figure 2:
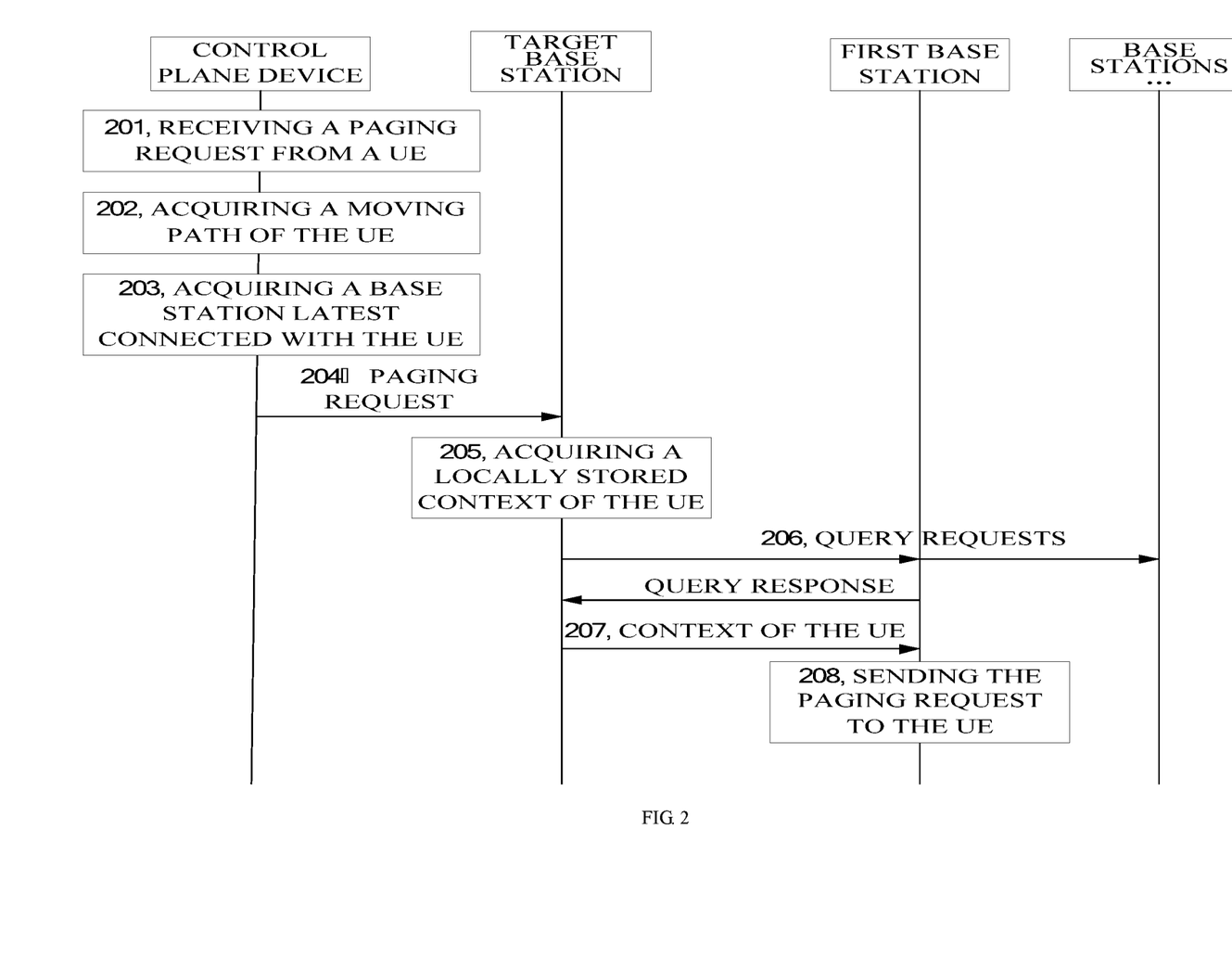
FIG. 2 is a flowchart of a paging method according to an example.

According to the above-described UE camping method, the UE performs cell reselection in a silence state and reselects a target camped cell. Accordingly, when the UE needs to perform data transmission later, the transmission may be performed via a base station corresponding to the target camped cell. In case the UE is paged by another UE, a paging request may be sent from the calling UE to its corresponding base station and forwarded by the base station to a control plane device, which upon receiving the paging request performs subsequent procedures to accomplish paging of the UE. In the embodiment of the disclosure, a specific flow of the paging method will be described by taking an example where the UE is paged by another UE. FIG. 2 is a flowchart of a paging method according to an example, in which a UE that has performed reselection to a target camped cell is paged. As shown in FIG. 2, the method comprises the following steps.

In step 201, a control plane device receives a paging request for the UE, the paging request carrying identification information of the UE.

The paging request for the UE may be sent by a calling UE to a base station whose coverage the UE is located in, and then sent to a control plane device by the base station. Transmission from the calling UE to the control plane device may comprise data transmission between control plane devices, which is not limited in the embodiment of the disclosure.

The identification information of the target UE may be an International Mobile Equipment Identity (IMEI), an International Mobile Subscriber Identification Number (IMSI), a Temporary Mobile Subscriber Identity (TMSI) or a System Architecture Evolution TMSI (S-TMSI) of the target UE or any other information for uniquely identifying the UE.

In step 202, the control plane device acquires a moving path of the UE through a tracking area update procedure, the moving path including at least one base station connected with the UE.

The control plane device is configured to manage UE mobility. During the movement of the UE, the control plane device records base stations accessed by the UE, corresponding cells, context and the like. Through the tracking area update procedure, information, such as which base stations and which cells the UE has accessed, can be acquired.

In step 203, a base station latest connected with the UE is acquired from the moving path of the UE as the target base station.

Because the context of the UE was stored by the base station when the UE switched from the RRC connection state to the silence state, the context of the UE can be acquired as long as the base station is found. Further, via the base station, a base station whose coverage the UE is currently located in can be found.

The above steps 202-203 constitute a process for determining a target base station. The target base station is a base station which stores the context of the UE. By finding the base station latest connected with the UE from the moving path of the UE, the control plane device can know the base station storing the context of the UE, thereby eliminating the need for sending paging requests to multiple base stations and significantly reducing the amount of network side signaling.

In step 204, the control plane device sends the paging request to the target base station.

After determining the target base station, the control plane device sends the paging request to the target base station. The paging request may also carry identification information of the UE, which has switched to a silence state in a cell covered by the base station and has performed reselection to a target camped cell.

Alternatively or additionally, paging requests may have the same format or different formats. The embodiment of the disclosure does not limit specific forms of the paging request communicated between the UE and the base station, the paging request communicated between the base station and the control plane device and the paging request communicated between the control plane device and the base station. These paging requests may have the same format or different formats, but all of them are specifically used for paging the UE.

In step 205, after receiving the paging request for the UE, the target base station acquires the context of the UE locally stored.

After receiving the paging request for the UE, the target base station may determine, based on the identification information of the UE, whether the context of the UE is locally stored. When the context of the UE is stored, then step 207 is performed. When the context of the UE is not stored, then a paging failure response is returned to the control plane device, which sends paging requests to multiple base stations for further paging the UE.

In step 206, the target base station sends query requests to multiple base stations. For example, the target base station may send each of the nearby base station a query request. Here, the multiple nearby base stations may include all base stations within a preset number of hops from the base station, the preset number may be a positive number less than 3. Each of the query requests may include the identification information of the UE.

The target base station sends query requests to multiple base stations. When receiving a respective query request, each base station may page, within its own coverage, the UE indicated by the query request. When any base station (for example, a first base station) finds the UE, it may return a query response to the target base station, informing the target base station that the UE is within its own coverage.

Further, because the UE is already not within the coverage of the target base station, it can be predicted that the UE is perhaps located near the target base station. Based on the prediction, the target base station may send query requests to multiple nearby base stations in order to find the UE. Such a manner of sending query requests to multiple nearby base stations can ensure the success of querying while reducing signaling consumption.

Further, the multiple nearby base stations include multiple base stations within a predetermined number of hops from the base station. For example, the multiple nearby base stations may be base stations within one hop from the base station or within two hops from the base station. Taking a cellular network as an example, there may be a circle of for example, six base stations around a base station. A base station which is reachable by a single signaling transmission is called one-hop base station, and a base station which is reachable by twice signaling transmissions (for example, a first transmission from the target base station to base station 1 and then a second transmission from base station 1 to base station 2) is called two-hop base station.

In step 207, when the target base station receives a query response from a first base station, it sends the context of the UE to the first base station, so that the first base station initiates paging of the UE.

In step 208, after receiving the context of the UE, the first base station sends the paging request to the UE based on the context of the UE.

In the embodiment of the disclosure, the first base station refers to a base station whose coverage the UE is currently located in. After the first base station determines that the UE is located within its own coverage, it may return a query response to the target base station. The target base station may send the context of the UE to the first base station, which sends the paging request to the UE within its own coverage.

Figure 3:
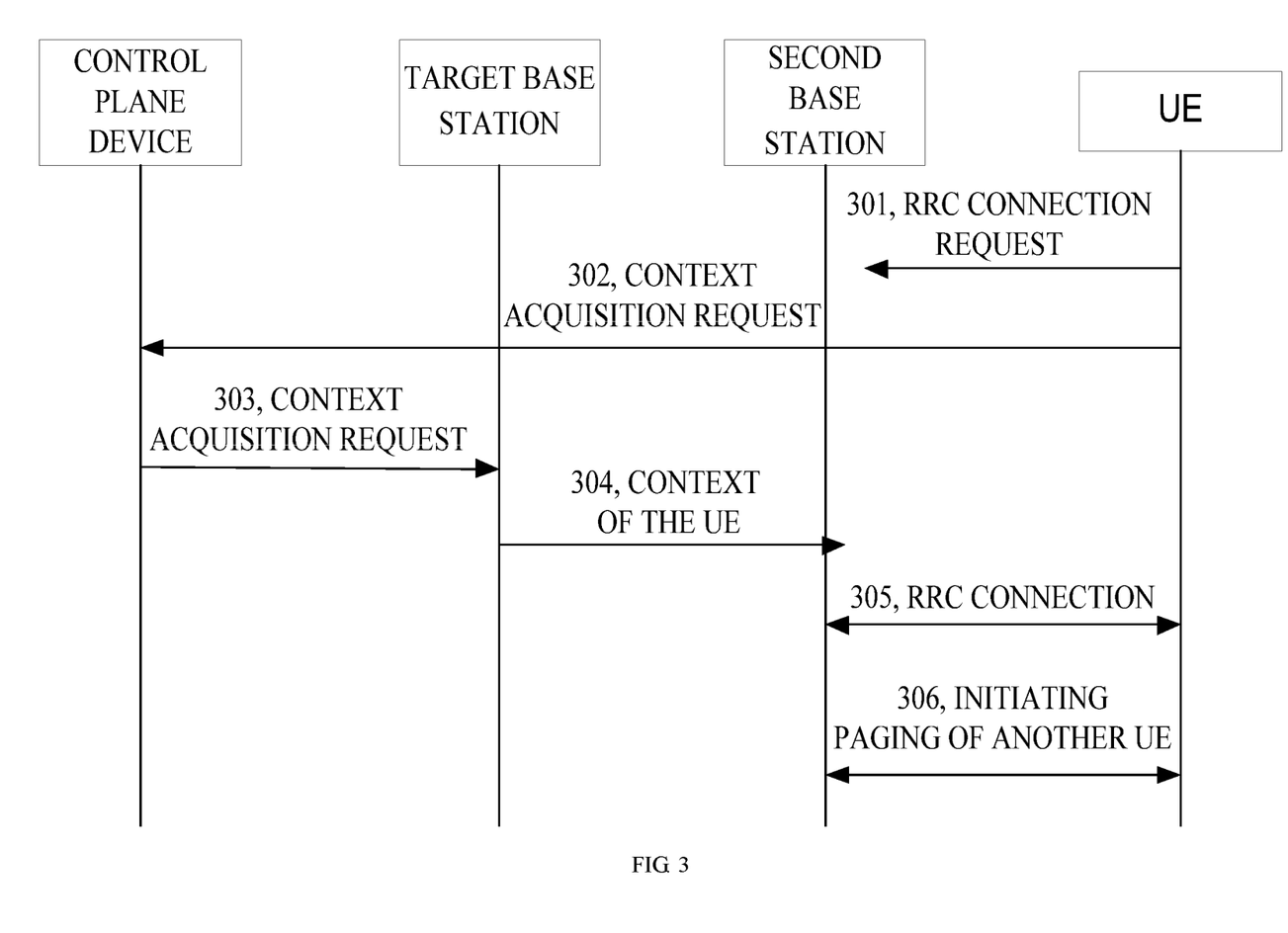
FIG. 3 is a flowchart of another paging method according to an example.

The above process is a specific process implemented when the UE serves as a called UE. In fact, however, the UE may also serve as a calling UE that initiates paging of another UE. In the following, a specific flow of a paging method according to an embodiment of the disclosure will be described by taking an example where a UE switched to a silence state initiates paging of another UE. FIG. 3 is a flowchart of a paging method according to an example. As shown, the method comprises the following steps.

At step 301, a UE sends an RRC connection request to a second base station, which is a base station corresponding to a target camped cell reselected by the UE.

At step 302, when receiving the RRC connection request, the second base station sends a context acquisition request to a control plane device.

At step 303, when receiving the context acquisition request, the control plane device sends a context acquisition request to a target base station.

At step 304, when receiving the context acquisition request, the target base station sends a context of the UE to the second base station, based on identification information of the UE carried by the context acquisition request.

At step 305, when receiving the context of the UE, the second base station establishes an RRC connection with the UE based on the context of the UE.

At step 306, the UE initiates paging of another UE based on the established RRC connection.

In the above process, it is also possible to make use of the context of the UE stored in the target base station to accomplish RRC connection establishment and hence paging at low signaling consumption.

Figure 4:
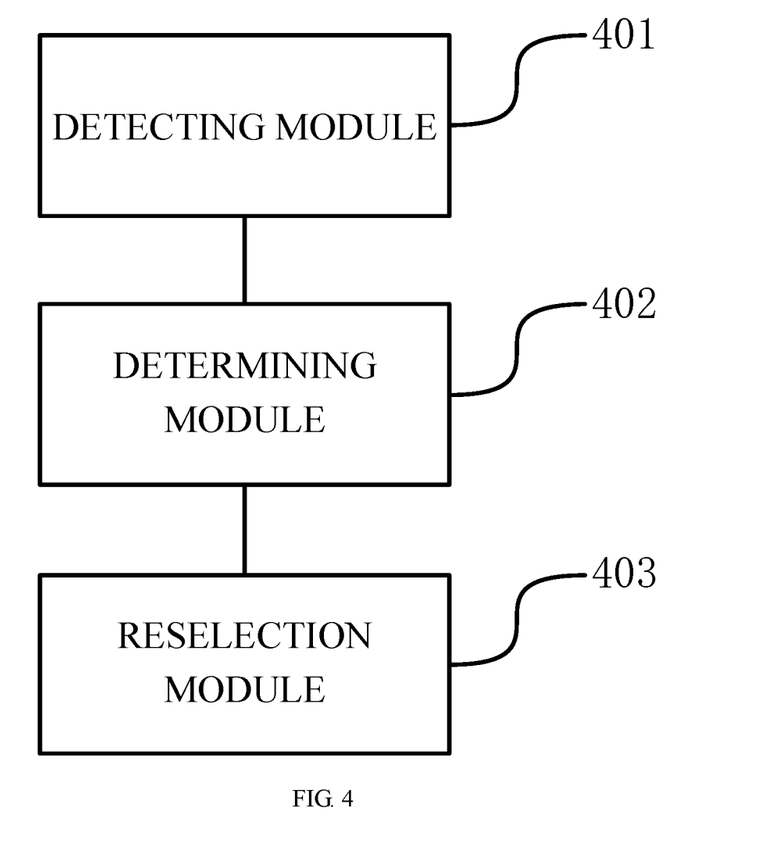
FIG. 4 is a block diagram of a user equipment camping apparatus according to an example.

FIG. 4 is a block diagram of a user equipment camping apparatus according to an example. As shown, the apparatus comprises the following modules 401-403.

The detecting module 401 is configured to detect a current camped cell.

The determining module 402 is configured to, when it is determined through the detection that the current camped cell satisfies a triggering condition and when the UE is in a silence state, determine a target camped cell, wherein the silence state is a state where the UE performs no data transmission after performing a data transmission.

The reselection module 403 is configured to perform reselection from the current camped cell to the target camped cell.

In a possible embodiment, the apparatus further comprises: a state confirming module configured to, When there is no data transmission request within a predetermined time period after the UE's data transmission is completed, determine that the UE switches from an RRC connection state to the silence state.

Figure 5:
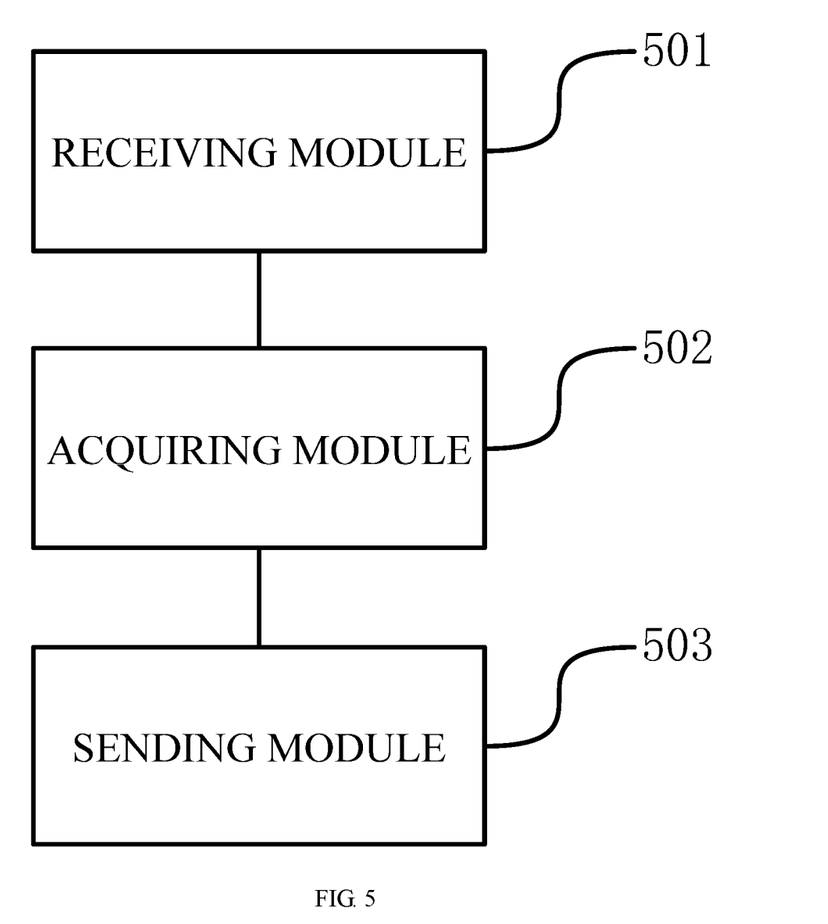
FIG. 5 is a block diagram of a paging apparatus according to an example.

FIG. 5 is a block diagram of a paging apparatus according to an example. As shown, the apparatus comprises the following modules 501-503.

The receiving module 501 is configured to receive a paging request for a UE, wherein the paging request carries identification information of the UE, and the UE has switched to a silence state in a cell covered by a base station and has performed reselection to a target camped cell.

The acquiring module 502 is configured to acquire a locally stored context of the UE.

The sending module 503 is configured to send query requests to a plurality of base stations, where each of the query requests may include the identification information of the UE.

The sending module 503 is further configured to, when a query response is received from a first base station, send the context of the UE to the first base station, so that the first base station initiates paging of the UE.

In a possible embodiment, the apparatus further comprises: a storage module configured to, when the UE switches from an RRC connection state to the silence state, store the context of the UE, the silence state being a state where the UE is not in the RRC connection state.

In a possible embodiment, the sending module is configured to send the query requests to a plurality of nearby base stations.

In a possible embodiment, the plurality of nearby base stations include base stations within a predetermined number of hops from the base station.

In a possible embodiment, the receiving module is further configured to receive a context acquisition request from a second base station, the context acquisition request carrying the identification information of the UE; and the sending module is further configured to send the context of the UE to the second base station, based on the identification information of the UE.

Figure 6:
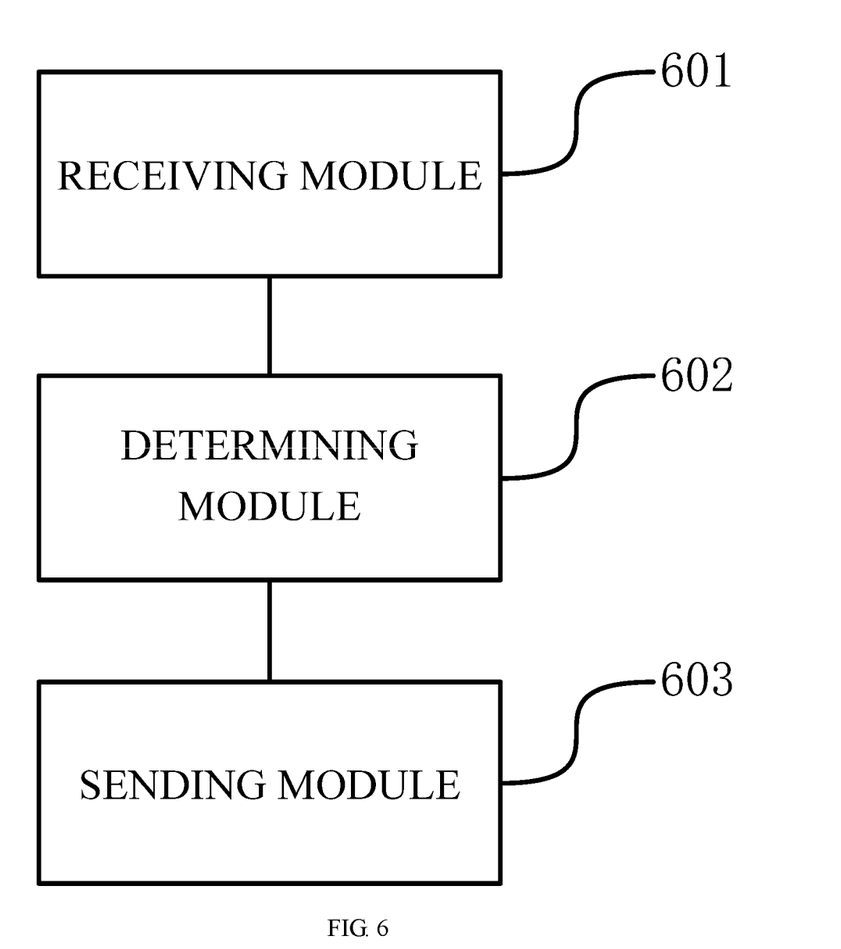
FIG. 6 is a block diagram of a paging apparatus according to an example.

FIG. 6 is a block diagram of a paging apparatus according to an example. As shown, the apparatus comprises the following modules 601-603.

The receiving module 601 is configured to receive a paging request from a UE, wherein the paging request carries identification information of a target UE, the UE has switched to a silence state in a cell covered by a target base station and has performed reselection to a target camped cell, and the target base station stores a context of the UE.

The determining module 602 is configured to determine the target base station.

The sending module 603 is configured to send the paging request to the target base station, so that the target base station performs paging.

In a possible embodiment, the apparatus further comprises: a path acquiring module configured to acquire a moving path of the UE through a tracking area update procedure, the moving path including at least one base station connected with the UE. Correspondingly, the determining module is configured to acquire, from the moving path of the UE, a base station latest connected with the UE as the target base station.

Regarding the apparatus in the above embodiments, the specific manners for the individual modules to perform operations have been described in detail in the embodiments of the related methods and will not be elaborated herein.

Figure 7:
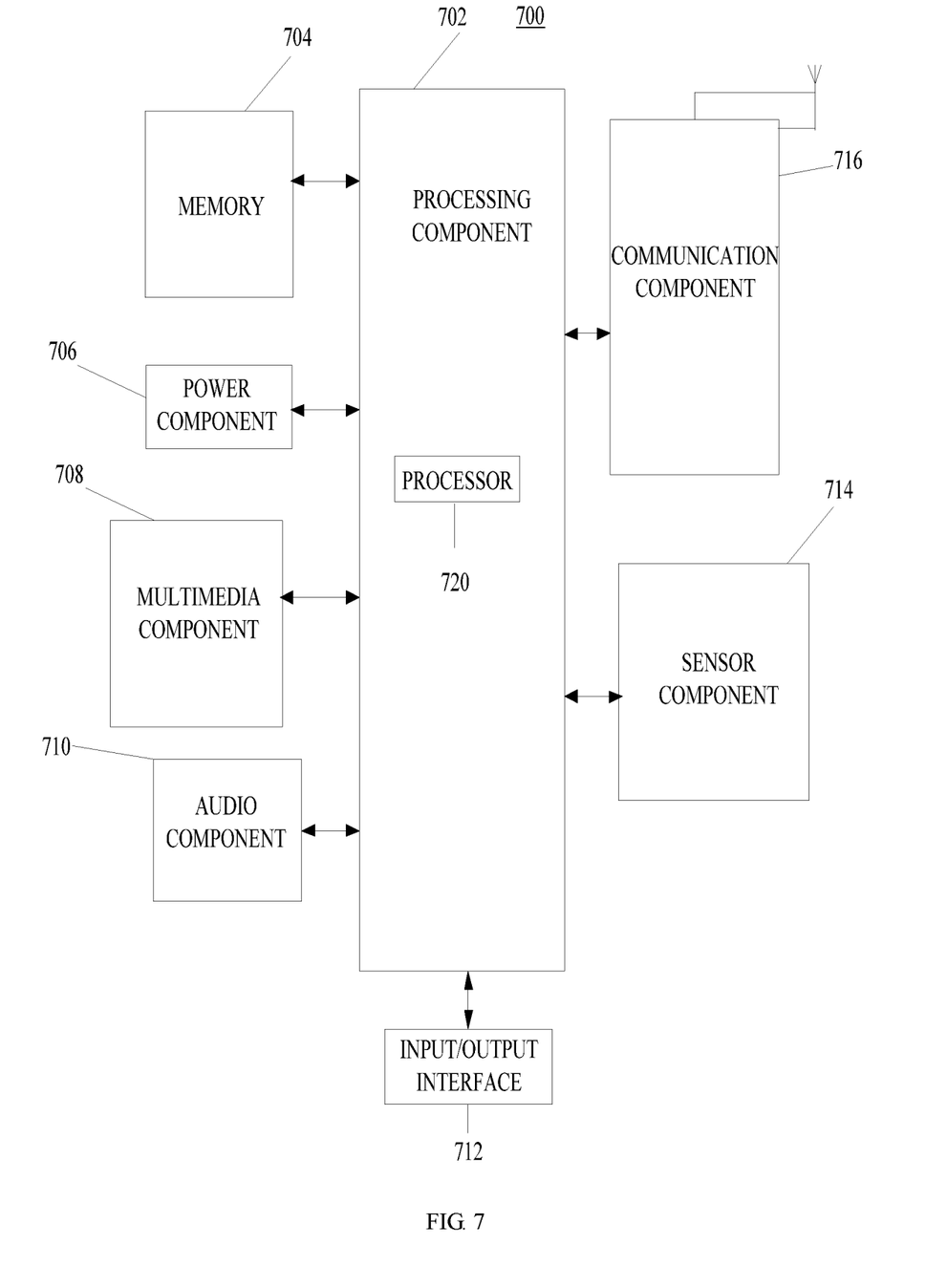
FIG. 7 is a block diagram of a user equipment camping apparatus 700 according to an example.

FIG. 7 is a block diagram of a user equipment camping apparatus 700 according to an example. For example, the apparatus 700 may be a mobile phone, a computer, a digital broadcast terminal, a messaging device, a gaming console, a tablet device, a medical device, exercise equipment, a personal digital assistant or the like.

Referring to FIG. 7, the apparatus 700 may comprise one or more of the following components: a processing component 702, a memory 704, a power component 706, a multimedia component 708, an audio component 710, an input/output (I/O) interface 712, a sensor component 714 and a communication component 716.

The processing component 702 typically controls overall operations of the apparatus 700, such as the operations associated with display, telephone calls, data communications, camera operations and recording operations. The processing component 702 may include one or more processors 720 to execute instructions to perform all or some of the steps in the above described methods. Moreover, the processing component 702 may include one or more modules which facilitate the interaction between the processing component 702 and other components. For example, the processing component 702 may comprise a multimedia module to facilitate the interaction between the multimedia component 708 and the processing component 702.

The memory 704 is configured to store various types of data to support the operation of the apparatus 700. Examples of such data comprise instructions for any applications or methods operated on the apparatus 700, contact data, phonebook data, messages, pictures, video, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may comprise a power management system, one or more power sources, and any other components associated with the generation, management, and distribution of power in the apparatus 700.

The multimedia component 708 comprises a screen providing an output interface between the apparatus 700 and the user. In some embodiments, the screen may comprise a liquid crystal display (LCD) and a touch panel (TP). When the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 comprises one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, presence or absence of user's contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor or a temperature sensor.

The communication component 716 is configured to facilitate communication, wired or wirelessly, between the apparatus 700 and other devices. The apparatus 700 can access a wireless network based on a communication standard, such as WiFi, 2Q or 3Q or a combination thereof. In one embodiment, the communication component 716 receives a broadcast signal or broadcast associated information from an external broadcast management system via a broadcast channel. In one embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above UE camping methods.

In an embodiment, there is also provided a non-transitory computer-readable storage medium comprising instructions, such as comprised in the memory 704, executable by the processor 720 in the apparatus 700, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein instructions that, when executed by a processor of a mobile terminal, cause the mobile terminal to perform the above-described user equipment camping method.

Figure 8:
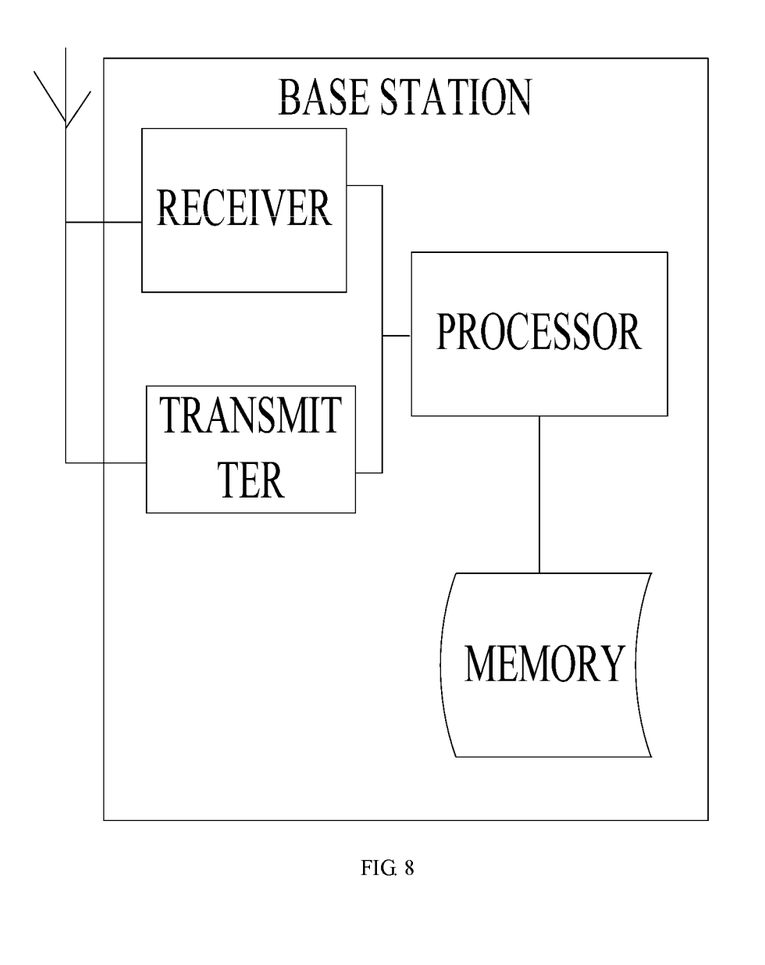
FIG. 8 is a schematic structural diagram of a base station according to an example.

FIG. 8 is a schematic structural diagram of a base station according to an example. As shown, the base station includes a transmitter, a receiver, a memory and a processor connected with the transmitter, the receiver and the memory. Alternatively or additionally, the base station may also include common components, such as an antenna, a baseband processing component, an intermediate frequency and radio frequency processing component, which is not limited in the embodiment of the disclosure.

The base station is configured to perform a paging method at base station side according to any of the embodiments shown in FIGS. 2 and 3. The transmitter and the receiver may be implemented as a transceiver. The processor may be a Central Processing Unit (CPU), a microprocessor, a single chip machine or the like.

Figure 9:
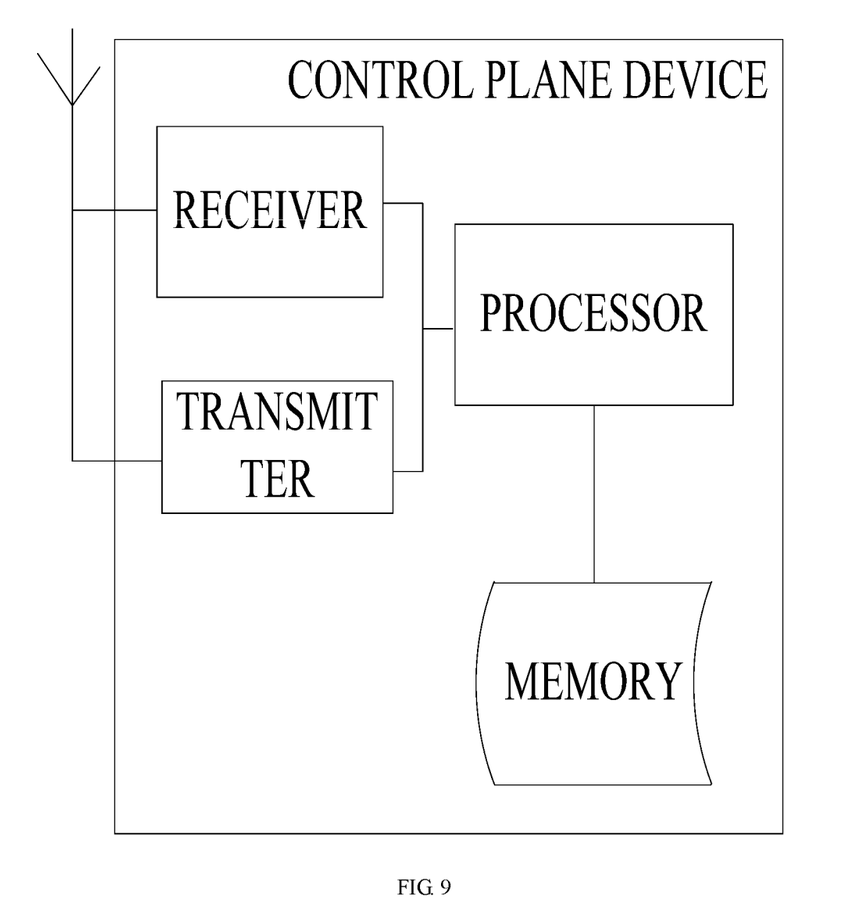
FIG. 9 is a block diagram of a control plane device according to an example.

FIG. 9 is a schematic structural diagram of a control plane device according to an example. As shown, the control plane device includes a transmitter, a receiver, a memory and a processor connected with the transmitter, the receiver and the memory. Alternatively or additionally, the control plane device may also include common components, such as an antenna, a baseband processing component, an intermediate frequency and radio frequency processing component, which is not limited in the embodiment of the disclosure.

The control plane device is configured to perform a paging method at control plane device side according to any of the embodiments shown in FIGS. 2 and 3.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A paging method, implemented in a base station and comprising:
   receiving a paging request for a user equipment (UE), wherein the paging request carries identification information of the UE, and the UE has switched to a silence state in a cell covered by the base station and has performed reselection to a target camped cell;
   acquiring a locally stored context of the UE, wherein the base station is a base station which locally stores the context of the UE for later query by other base stations;
   sending query requests to a plurality of base stations, each of the query requests carrying the identification information of the UE; and
   when receiving a query response from a first base station, sending the context of the UE to the first base station, so that the first base station initiates paging of the UE based on the context of the UE.

2. The method of claim 1, wherein, before receiving the paging request, the method further comprises:
   when the UE switches from a Radio Resource Control (RRC) connection state to the silence state, storing the context of the UE, the silence state being a state where the UE performs no data transmission after performing a data transmission.

3. The method of claim 1, wherein sending the query requests to the plurality of base stations comprises sending the query requests to a plurality of nearby base stations.

4. The method of claim 3, wherein the plurality of nearby base stations include base stations within a predetermined number of hops from the base station.

5. The method of claim 3, further comprising:
   receiving a context acquisition request from a second base station, the context acquisition request carrying the identification information of the UE; and
   sending the context of the UE to the second base station, based on the identification information of the UE.

6. A base station, comprising a transmitter, a receiver, a non-transitory computer-readable storage medium, and one or more processors connected with the transmitter, the receiver and the non-transitory computer-readable storage medium,
   wherein the one or more processors are configured to:
   receive a paging request for a user equipment (UE), wherein the paging request carries identification information of the UE, and the UE has switched to a silence state in a cell covered by the base station and has performed reselection to a target camped cell;
   acquire a locally stored context of the UE, wherein the base station is a base station which locally stores the context of the UE for later query by other base stations;
   send query requests to a plurality of base stations, each of the query requests carrying the identification information of the UE; and
   when receiving a query response from a first base station, send the context of the UE to the first base station, so that the first base station initiates paging of the UE based on the context of the UE.

7. The base station of claim 6, wherein the one or more processors are further configured to:
   before receiving the paging request,
   when the UE switches from a Radio Resource Control (RRC) connection state to the silence state, store the context of the UE, the silence state being a state where the UE performs no data transmission after performing a data transmission.

8. The base station of claim 6, wherein sending the query requests to the plurality of base stations comprises sending the query requests to a plurality of nearby base stations.

9. The base station of claim 8, wherein the plurality of nearby base stations include base stations within a predetermined number of hops from the base station.

10. The base station of claim 8, wherein the one or more processors are further configured to:
    receive a context acquisition request from a second base station, the context acquisition request carrying the identification information of the UE; and
    send the context of the UE to the second base station, based on the identification information of the UE.

11. A non-transitory computer-readable storage medium having stored therein instructions that, when executed by one or more processors of a base station, causes the base station to perform a paging method, the method comprising: receiving a paging request for a user equipment (UE), wherein the paging request carries identification information of the UE, and the UE has switched to a silence state in a cell covered by the base station and has performed reselection to a target camped cell; acquiring a locally stored context of the UE, wherein the base station is a base station which locally stores the context of the UE for later query by other base stations; sending query requests respectively to a plurality of base stations, each of the query requests carrying the identification information of the UE; and when receiving a query response from a first base station, sending the context of the UE to the first base station, so that the first base station initiates paging of the UE based on the context of the UE.

12. The storage medium of claim 11, wherein, before receiving the paging request, the method further comprises:
    when the UE switches from a Radio Resource Control (RRC) connection state to the silence state, storing the context of the UE, the silence state being a state where the UE performs no data transmission after performing a data transmission.

13. The storage medium of claim 11, wherein sending the query requests to the plurality of base stations comprises sending the query requests to a plurality of nearby base stations.

14. The storage medium of claim 13, wherein the plurality of nearby base stations include base stations within a predetermined number of hops from the base station.

15. The storage medium of claim 13, further comprising:
    receiving a context acquisition request from a second base station, the context acquisition request carrying the identification information of the UE; and
    sending the context of the UE to the second base station, based on the identification information of the UE.

* * * * *